US008429612B2

(12) United States Patent
Milov

(10) Patent No.: US 8,429,612 B2
(45) Date of Patent: Apr. 23, 2013

(54) GRAPHICAL USER INTERFACE (GUI) NOISE REDUCTION IN A COGNITIVE CONTROL FRAMEWORK

(75) Inventor: Denis Sergeevich Milov, Kirishi (RU)

(73) Assignee: Intel Corporation, Santa Clara, CA (US)

( * ) Notice: Subject to any disclaimer, the term of this patent is extended or adjusted under 35 U.S.C. 154(b) by 1995 days.

(21) Appl. No.: 10/587,342

(22) PCT Filed: Nov. 11, 2005

(86) PCT No.: PCT/RU2005/000559
§ 371 (c)(1),
(2), (4) Date: Jul. 25, 2006

(87) PCT Pub. No.: WO2007/055612
PCT Pub. Date: May 18, 2007

(65) Prior Publication Data
US 2008/0294985 A1    Nov. 27, 2008

(51) Int. Cl.
*G06F 9/44*    (2006.01)
(52) U.S. Cl.
USPC .......................... 717/124; 717/135; 715/704
(58) Field of Classification Search .................. None
See application file for complete search history.

(56) References Cited

U.S. PATENT DOCUMENTS

| | | |
|---|---|---|
| 5,335,342 A | 8/1994 | Pope et al. |
| 5,600,789 A | 2/1997 | Parker et al. |
| 5,715,108 A | 2/1998 | Yoo |
| 5,758,062 A * | 5/1998 | McMahon et al. .......... 714/38.11 |
| 6,203,425 B1 | 3/2001 | Hayashi |
| 7,165,191 B1 * | 1/2007 | Vakrat .......................... 714/38.1 |
| 7,478,182 B2 | 1/2009 | Schweig |
| 7,617,299 B2 | 11/2009 | Yoshimine |
| 7,644,368 B2 * | 1/2010 | Pins .............................. 715/762 |
| 7,653,896 B2 * | 1/2010 | Herdeg, III .................... 717/113 |

(Continued)

FOREIGN PATENT DOCUMENTS

| | | |
|---|---|---|
| WO | WO 03/089550 A2 | 5/2003 |
| WO | 2006132564 A1 | 12/2006 |

OTHER PUBLICATIONS

"AcuTest", *Tevron product description*, XP-002383092., (2004),1-2.

(Continued)

*Primary Examiner* — Chat Do
*Assistant Examiner* — Jue Wang
(74) *Attorney, Agent, or Firm* — Trop, Pruner & Hu, P.C.

(57) ABSTRACT

Reducing graphical user interface (GUI) noise maybe achieved by recording a first execution scenario for control of operation of an application program having a GUI during a recording phase of operation of a cognitive control framework system, setting soft conditions for a search for the application program for the first execution scenario, playing back the application program according to the first execution scenario during a playback phase of operation of the cognitive control framework system, updating the first execution scenario to form a second execution scenario to reduce GUI noise conditions observed during playback, including updating recorded images originally generated by the GUI during the recording phase and updating coordinates for user input data, setting stronger conditions for the search for use in subsequent playbacks; and playing back the application program according to the second execution scenario with the stronger conditions for search.

19 Claims, 15 Drawing Sheets

U.S. PATENT DOCUMENTS

| | | | |
|---|---|---|---|
| 2002/0156829 | A1 | 10/2002 | Yoshimine |
| 2003/0023952 | A1 | 1/2003 | Harmon, Jr. |
| 2003/0172374 | A1 | 9/2003 | Vinson et al. |
| 2003/0236775 | A1* | 12/2003 | Patterson .......................... 707/3 |
| 2004/0194065 | A1* | 9/2004 | McGrath et al. .............. 717/124 |
| 2005/0021289 | A1* | 1/2005 | Robertson et al. ............ 702/182 |
| 2005/0177772 | A1* | 8/2005 | Derks et al. .................... 714/25 |
| 2009/0103769 | A1 | 4/2009 | Milov et al. |
| 2010/0138360 | A1 | 6/2010 | Cutler et al. |

OTHER PUBLICATIONS

"Eggplant Software Automation and Testing", XP-002383091., Product Description,(2004),1-19.

Herron, David , "Accessibility for Test Automation", *David Herron's Blog*, XP-002388052., (2005),1-3.

Ostrand, Thomas , "A Visual Test Development Environment for GUI Systems", *Siemens Corporate Research*, pp. 82-92, XP-000740949, (1998),82-92.

International Preliminary Report on Patentability for PCT Patent Application No. PCT/RU2005/000559, mailed May 22, 2008, 8 pages.

"Eggplant Tutorial for Use with a MAC OS X System-Under-Test, Eggplant Version 3.1," Redstone Software, Inc. XP-002397141, Jun. 3, 2005, pp. 1-18.

International Search Report and Written Opinion received for PCT Patent Application No. PCT/RU2005-000325, mailed on Jun. 19, 2006, 11 pages.

\* cited by examiner

GRAPHICAL USER INTERFACE (GUI) NOISE REDUCTION IN A COGNITIVE CONTROL FRAMEWORK

CROSS-REFERENCE TO RELATED APPLICATION

This application is a National Phase application of, and claims priority to, International Application No. PCT/RU2005/000559, filed Nov. 11, 2005, entitled GRAPHICAL USER INTERFACE (GUI) NOISE REDUCTION IN A COGNITIVE CONTROL FRAMEWORK

BACKGROUND

1. Field

The present invention relates generally to automatic control of software application programs and image analysis and, more specifically, to analyzing graphical user interface (GUI) images displayed by an application program for automatic control of subsequent execution of the application program.

2. Description

Typical application program analysis systems capture keyboard input data and mouse input data entered by a user. The captured input data may then be used to replay the application program. These systems rely on playback of the application program on the same computer system used to capture the input data, and thus are not portable.

Some existing application program analysis systems use image recognition techniques that are dependent on screen resolution and/or drawing schemes, or have strong dependencies to the underlying operating system (OS) being used. Such systems typically rely on dependencies such as Windows32 or X-Windows application programming interfaces (APIs). This limits their portability and usefulness.

Hence, better techniques for analyzing the GUIs of application programs are desired.

BRIEF DESCRIPTION OF THE DRAWINGS

The features and advantages of the present invention will become apparent from the following detailed description of the present invention in which.

DETAILED DESCRIPTION

Embodiments of the present invention comprise a cognitive control framework (CCF) for automatic control of software application programs that have a graphical user interface (GUI). Examples of such applications programs may be executed on current operating systems such as Microsoft Windows® and Linux, for example, as well as other operating systems. An embodiment of the present invention creates a system simulating a human user interacting with the GUI of the application program and using the GUI for automatic control of the application program without relying on dependencies such as specific graphical libraries, windowing systems, or visual controls interfaces or implementations. The CCF comprises an easy-to-use cross-platform tool useful for GUI testing based on pattern recognition. By being independent of any OS-specific controls and graphical libraries, the CCF may be used for interaction with non-standard graphical interfaces as well as with well known ones. The system provides for recording any kind of keyboard and mouse actions the user performs while working with the GUI of the application program and then providing playback of the recorded scenario. In the present invention, image analysis of captured display data (such as screen shots, for example) is performed to identify actions of the application program corresponding to user input data. These actions and input data may be stored for use in future playback of the same user scenario for automatically interacting with the application program.

Embodiments of the present invention comprise operating on two phases: a recording phase and a playback phase. During the recording phase, the system is "learning" how to control the application program. The system registers and captures input actions supplied by the user (such as a mouse click or entering of text via a keyboard, for example) and display data (e.g. screen shots) of images displayed by the application program in response to those actions. The user actions, the time interval between actions, resulting display data of the GUI of the application program, and possibly other data and/or commands form an execution scenario. By following the execution scenario, during the playback phase the system provides the same but fully automatic execution of the application program (simulating the user control but without the real presence of the user). Automatic execution is made possible due to a plurality of image analysis and structural techniques applied correspondingly to images during the recording and playback phases.

Figure 1:
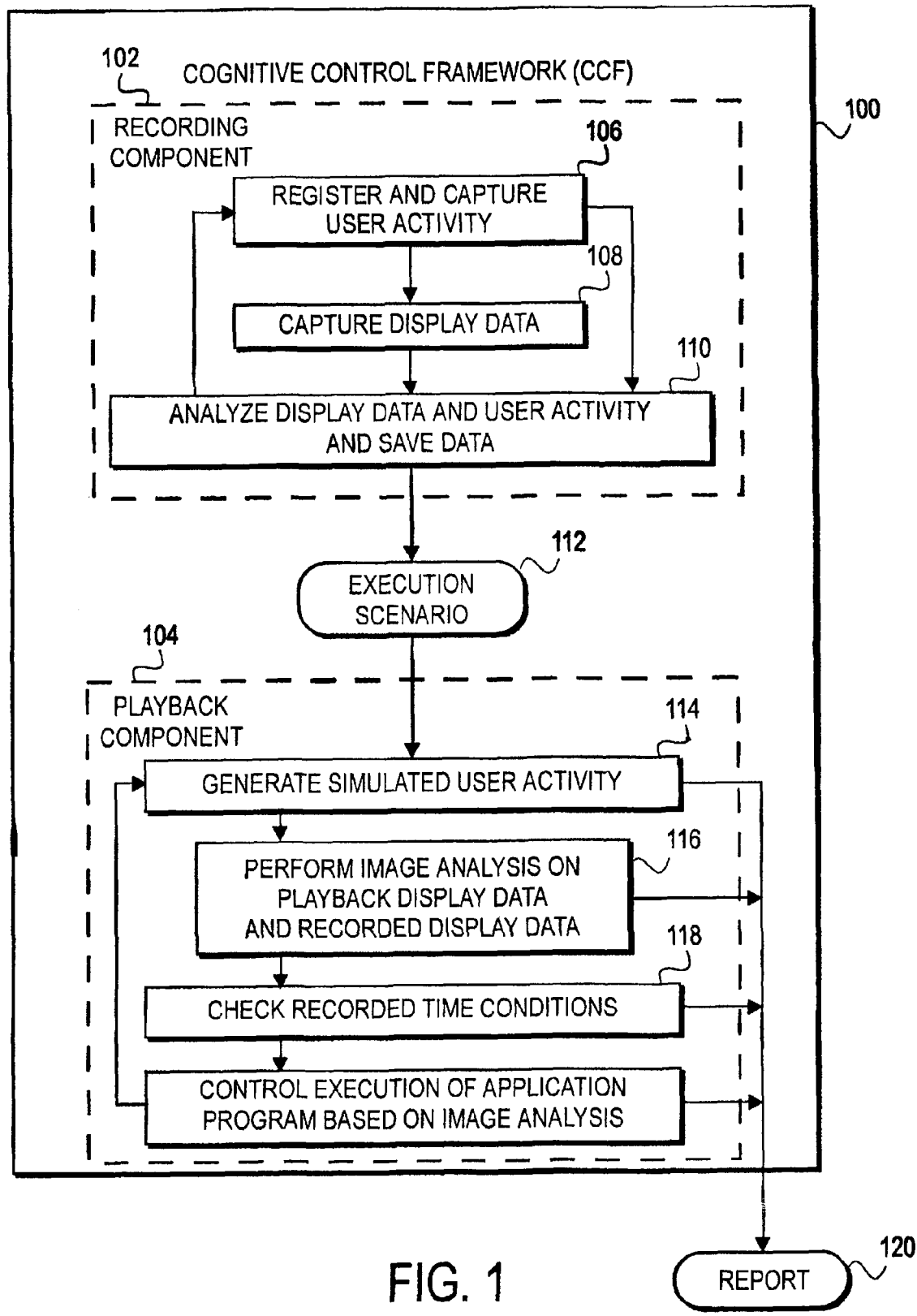
FIG. 1 is a diagram of a cognitive control framework system according to an embodiment of the present invention.

FIG. 1 is a diagram of a cognitive control framework (CCF) system 100 according to an embodiment of the present invention. FIG. 1 shows two components, recording component 102 and playback component 104. These components may be implemented in software, firmware, or hardware, or a combination of software, firmware and hardware. In the recording component, the CCF system registers and captures user input activity at block 106. For example, the user may make input choices over time to an application program being executed by a computer system using a mouse, keyboard, or other input device. This input data is captured and stored by the CCF system. Next, at block 108, the display data may be captured (e.g. screen shots are taken). In one embodiment, the display data may captured only when user input has been received by the application program. The display data is also saved. At block 110, the data captured during blocks 106 and 108 may be analyzed and saved. These processes may be repeated a plurality of times. The result of the processing of the recording component comprises an execution scenario 112 for the application program being processed by the system. In one embodiment, the execution scenario comprises a script containing Extended Markup Language (XML) tags. The execution scenario describes a sequence of user inputs to the application program, corresponding display images on a GUI of the application program, and commands directing the application program to perform some actions.

At a later point in time, during the playback phase the playback component 104 may be initiated. At block 114, simulated user activity may be generated based on the execution scenario. That is, saved inputs and commands from the execution scenario may be input to the application program for purposes of automatic control using the CCF system. While the application program processes this data, display data may be changed on the display as a result. At block 116, the CCF system performs image analysis on the playback display data currently being shown as a result of application program processing and the display data captured during the recording phase. At block 118, recorded time conditions may be checked to take into account possible variations in playback. For example, the time when an object appears may be within a time interval based on a recorded time. For example, in one embodiment a lower bound time (time to start the search) may be extracted from the saved data in the execution scenario and an upper bound time may be the lower bound time plus 10%, or some other appropriate value. Processing of blocks 114, 116, and 118 each result in data being stored in report 120. At block 119, the CCF system controls execution of the application program based on the results of the image analysis. Blocks 114, 116 and 118 may be repeated for each in a sequence of user input data items from the execution scenario.

The time interval between sequential actions is a part of the captured execution scenario. However, while following the execution scenario in the playback phase, one should not expect that the time interval between any two actions at playback will be equal to the time interval between the same two actions during the recording phase. There are a number of objective reasons why this interval could be different on playback than during recording. For example, the application program during recording and playback may be executed on different computer systems having different processor speeds, or an application program could require different times for the same actions during playback due to accesses of external data or resources. This indicates a requirement in the CCF system to handle flexible time conditions, e.g. handle some tolerance for the time interval between actions during the playback phase. During that time interval at playback, the system checks the recorded display data to the playback display data several times to determine if the playback display data is substantially similar to the recorded display data. A finding that the two are substantially similar indicates that a previous user action has completed and the system can progress to the next action in the execution scenario. This activity may be similar to the situation where the user is interacting with the application program and pauses periodically to view the display to determine if the expected visible changes to the display have been made by the application program based on previous actions. If so, then a new action may be performed. If at the end of a higher bound of the time interval the application program has not produced an image on the display that the CCF system expected according to the execution scenario, then the CCF system may interrupt the playback of the execution scenario and generate an error report describing how the execution scenario has not been followed. In one embodiment, the scenario may be corrected and the CCF system may be required to use other branches to continue.

The cognitive control framework (CCF) system of embodiments of the present invention performs image analysis and object detection processing on display data from the GUI of the application program. The CCF system includes comparing an image captured during a recording phase (called IR) to the corresponding image captured during the playback phase (called IP). One task of the system is to detect an object in the IR to which the user applied an action, find the corresponding object in the IP, and continue progress on the execution path of the execution scenario by applying the action to the detected object. These steps may be repeated for multiple objects within an image, and may be repeated across multiple pairs of IRs and IPs over time. An object that the user has applied an action to may be called an "object of action." Absence in the IP of the object of action corresponding to the one found at IR means that one should capture the IP again at a later time and try to find the object of action again. Finally, either an object of action may be found in the IP or execution of the scenario may be halted and a report generated describing how the wrong state was achieved and the scenario may not be continued. In embodiments of the present invention, this detection of objects of action may be done in real time during the playback phase, progressing from one action to another. Thus, the image analysis process employed must have good performance so as to introduce only a minimal disturbance to the time conditions at playback.

The CCF system of embodiments of the present invention comprises an image analysis and detecting process. Such a process has at least two requirements. First, the process should be able to overcome some variations in the captured images such as different color scheme, fonts, and the layout and state of the visual elements. In one embodiment, comparison constraints for checking these items (color scheme, fonts, etc.) may be set to specified parameters in accordance with specific needs. Overcoming these variations is desirable because recording and playback might be executed in different operating environments such as different screen resolutions, different visual schemes, different window layouts, and so on. Additionally, there could be insignificant differences in corresponding IR (usually captured after an action was applied to an object of interest) and IP pairs (captured after a previous action was completed). Second, the implementation of the image analysis and object detection process should be fast enough to introduce only minimal disturbances and delay of application execution during playback.

By processing captured images, the system builds descriptions of the images in terms of the objects presented on them. Each display object may be represented by its contour and a plurality of properties. Table I enumerates some possible contour properties for use in the present invention. In other embodiments, other properties may also be used.

TABLE 1

Contour properties

| Property | Description |
|---|---|
| Location | Coordinates (on the image) of the contour center. |
| Image size | Characteristic contour size. In case of rectangular contours they are just vertical and horizontal sizes. For controls of more complicated shape, another format may be used. |
| Layout | Connection to other contours that lay in proximity to its boundaries/layout pattern of this contour. |
| Content Type | Indicates what is inside of the contour: text, image or a combination. |
| Content | If the content type is text, then a text string; if image (e.g. icon), then the image. |

Figure 2:
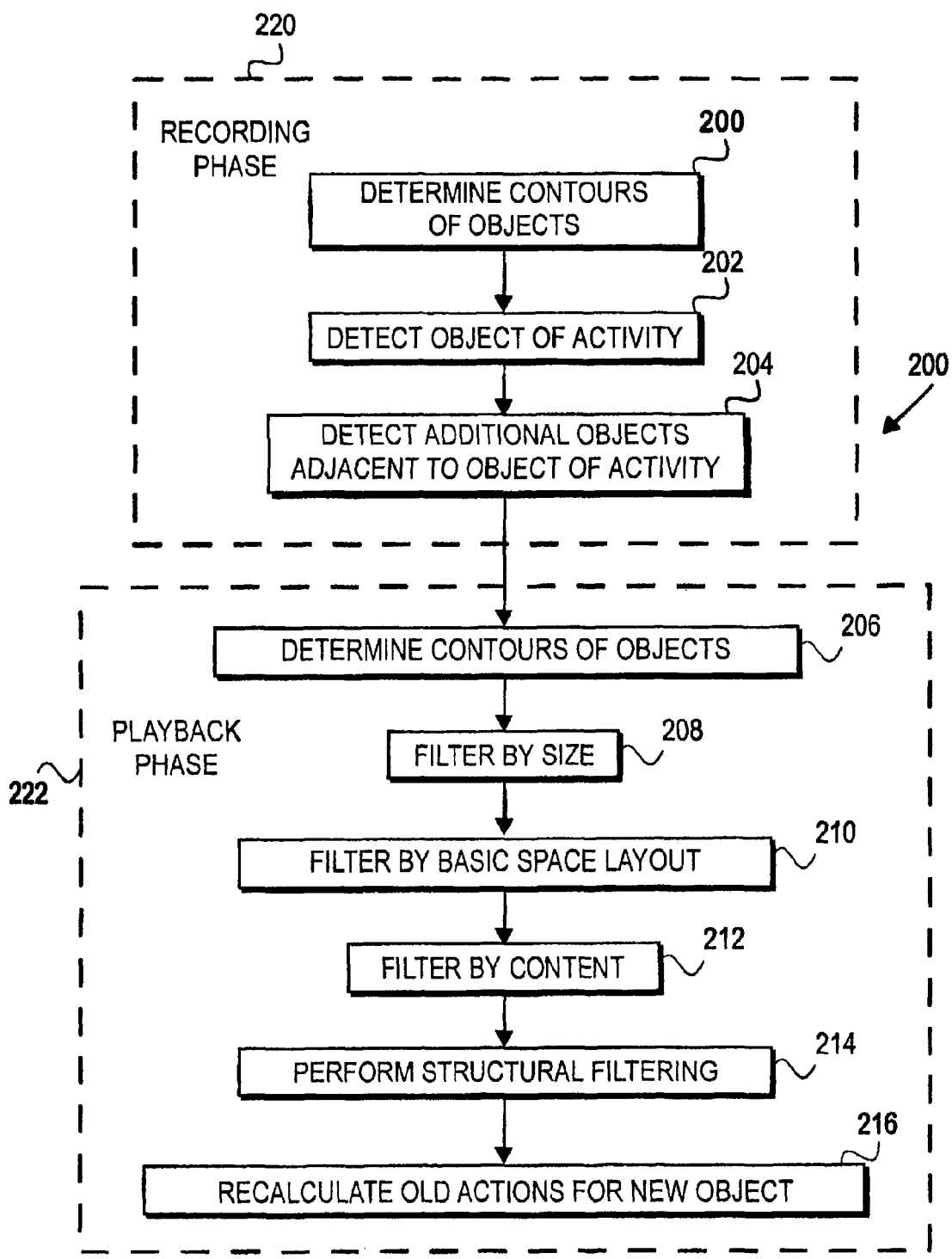
FIG. 2 is a flow diagram illustrating processing in a cognitive control framework according to an embodiment of the present invention.

FIG. 2 is a flow diagram illustrating processing of a CCF system according to an embodiment of the present invention. During the recording phase 220 handled by recording component 102, at block 200 the system determines contours of objects in the IR. At block 202, the system detects a current object of activity. At block 204, the system detects additional objects adjacent to the current object of activity in the IR. These steps (200, 202, and 204) may be repeated over time for all objects of activity during execution of the application program in the recording phase.

Next, during the playback phase 222 handled by playback component 104, at block 206 the CCF system determines the contours of objects in the IP. At block 208, the CCF system filters contours by size to determine contours that may become hypotheses for active objects and contours that connect them. At block 210, the CCF system filters the objects by basic space layout in the IP to determine subsets of hypotheses for active and additional objects. For example, filtering criteria for space layout may include tables, wizards, and menus. In one embodiment, the user (or CCF schema with a cascade search) could set both strict (e.g. "as is") and fuzzy (e.g. "object could be near each other") conditions. At block 212, the CCF system filters the objects by content to produce further subsets of hypotheses for active and additional objects. For example, the filtering criteria by content may include images and text. Moreover, in one embodiment, the user (or CCF schema with cascade search) could set both strict (e.g. "image should have difference in a few points and text should have minimal differences on a base of Levenstein distance") and fuzzy (e.g. "image could be stable to highlighting and have insignificant structural changes and text could have noticeable differences on a base of Levenstein distance without consideration of digits") conditions. At block 214, the CCF system performs structural filtering of the objects to produce a best hypothesis for active objects.

Finally, at block 216, the CCF system recalculates old actions for a new object by applying the action according to the execution scenario. For example, suppose the user selected (via the mouse) the screen location at (X=70, Y=200), and that a button is displayed at the rectangle denoted (X1=50, Y1=150, X2=100, Y2=100). In the IP, the button may be represented as a rectangle denoted (X1=250, Y1=300, X2=200, Y2=100). For a general view, coordinates of the top left corner and the size of the rectangle may be changed. The mouse click (user selection) may be recalculated based on the position of the button and the scaled size (for X and Y coordinates). The calculation gives the new mouse click coordinates (e.g., X=290, Y=350).

Table II shows the input data and output of the image analysis process for FIG. 2.

TABLE II

Image Analysis Processing

| Step | Input Data | Result | Input parameters and Description |
|---|---|---|---|
| 1. Contouring | Image from recoding (IR) | Contours | Thresholds, distances between objects (with some tolerance). Intel ® OpenCV library used in one embodiment. |
| 2. Detecting object of activity | Image IR and contours from previous step. | Contour representing object of activity | Typical object size (with tolerance) for object of action. Optical character recognition (OCR) and fuzzy text comparison, e.g. with Levenshtein distance. |
| 3. Detecting additional objects around object of activity | Image IR, contours and active objects. | Additional objects and their layout against object of action | Typical object size (with tolerance) for additional objects. Structural |

TABLE II-continued

Image Analysis Processing

| Step | Input Data | Result | Input parameters and Description |
|---|---|---|---|
| 4. Contouring | Image from playback (IP) | Contours | analysis, e.g. "criss-cross" rules. Thresholds, distances between objects (with some tolerance). Intel ® OpenCV library used in one embodiment. |
| 5. Filtering by size | Contours from previous step | Contours that become hypotheses for active object and contours connected with them | Mean object size (with tolerance) based on active object characteristics evaluated at Step 2. Typical object size (with tolerance) for additional objects. Filtering out contours that don't fit into input size limits. |
| 6. Filtering by basic space layout | Subsets of hypotheses for active and additional objects | Decreased subsets of hypotheses for active and additional objects | Fuzzy distance filtration. Fuzzy filtration for directions. |
| 7. Filtering by content | Subsets of hypotheses for active and additional objects | Decreased subsets of hypotheses for active and additional objects | OCR and fuzzy text comparison, e.g. with Levenshtein distance. Fuzzy image comparison. Using "fuzzy content type" method for filtration. |
| 8. Structural filtering | Subsets of hypotheses for active and additional objects | The best hypothesis for active objects. | Method based on fuzzy triple links both between objects from IR and their hypotheses from IP. It's stable to additional objects which don't have strong structural links with active object. Moreover, one can use the result of this method to choose the best hypotheses for active objects. Some other methods, e.g. Hough transformation may also be used here. |
| 9. Recalculating old actions for new object | Object of action | Applied the action according to the execution scenario | Recalculating action coordinates in IP (playback image) coordinate system |

During filtering at each step there is an evaluation of specific contour properties (as required for a specific filter). This filtering pipeline is designed in such a way that the most time consuming evaluation steps are shifted to later in the processing pipeline when the number of contours (hypotheses) is smaller. By using this approach, the overall computational cost may be decreased, thereby helping to ensure good performance of the system.

It is useful to maintain a compromise in order to make sure that the system does not filter out some contours in the early steps that may be later determined to be either a hypothesis of an object of activity or objects connected with an object of activity. In this regard, predefined input parameters may be set to broad limits that requires spending a little more time on processing of additional contours (hypotheses), but ensure that the system has not dropped important contours.

Figure 3:
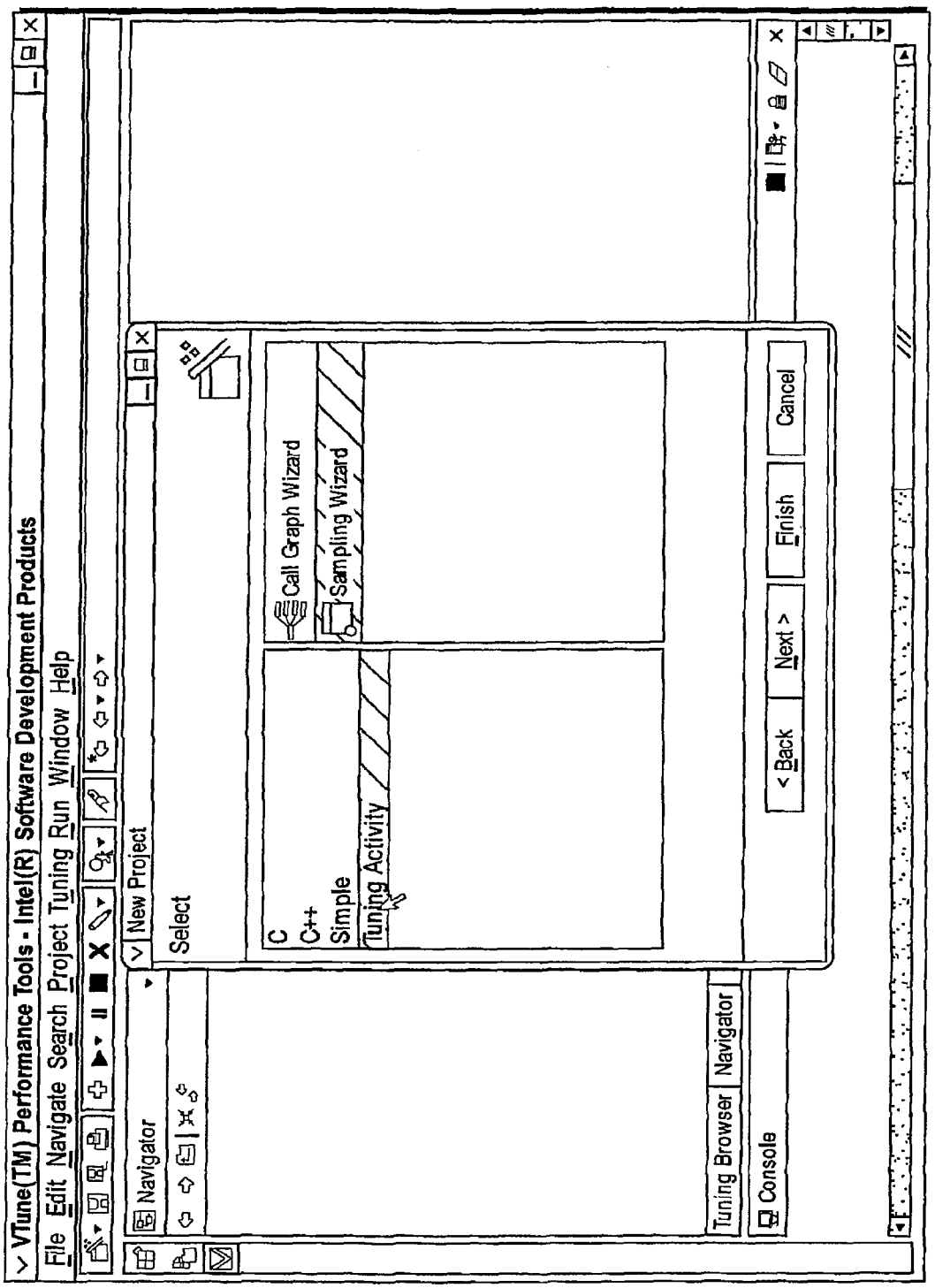
FIG. 3 is an example display of the GUI of an application program captured and saved during a recording phase.
Figure 4:
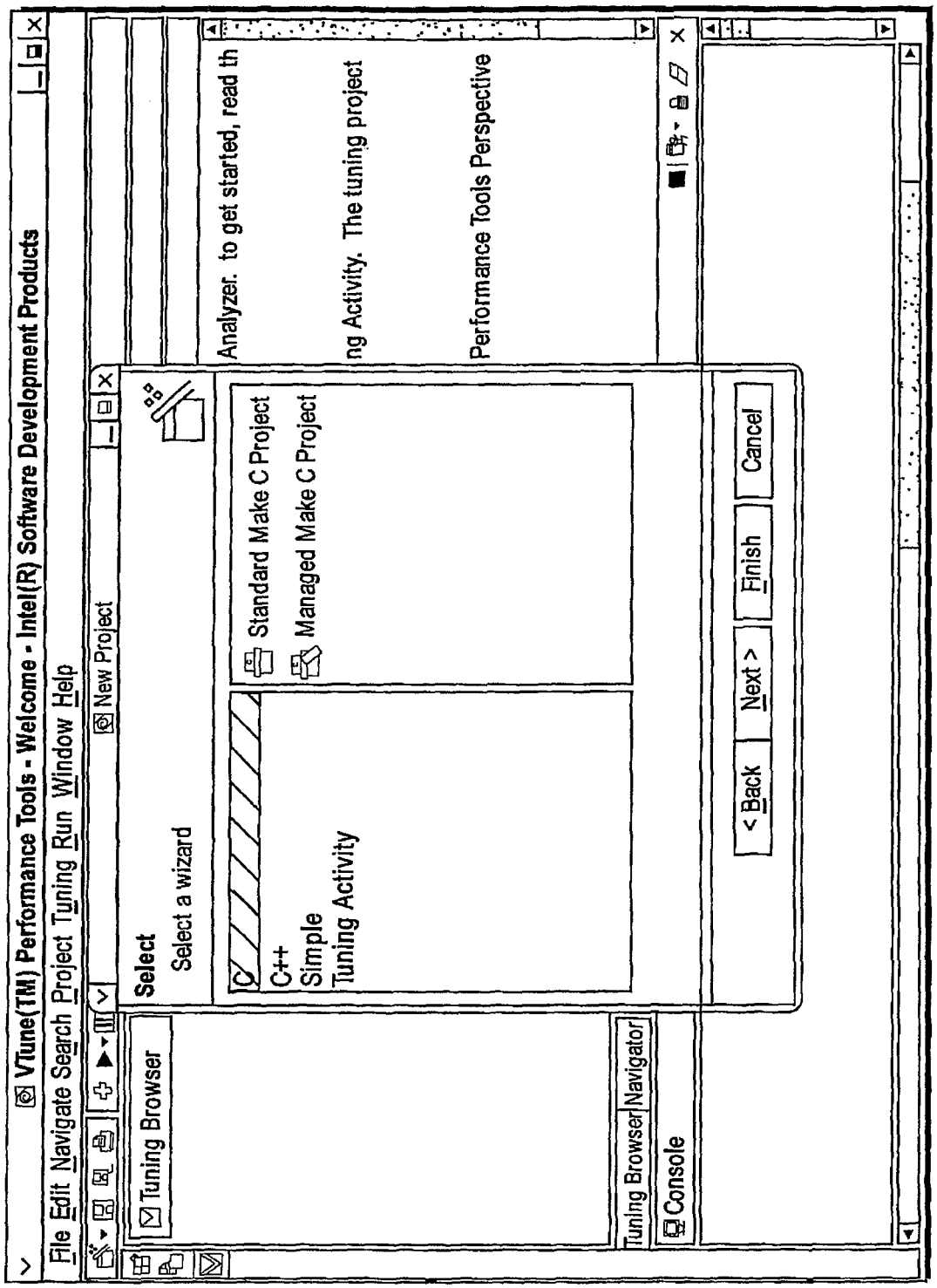
FIG. 4 is an example display of the GUI of an application program captured during a playback phase.
Figure 5:
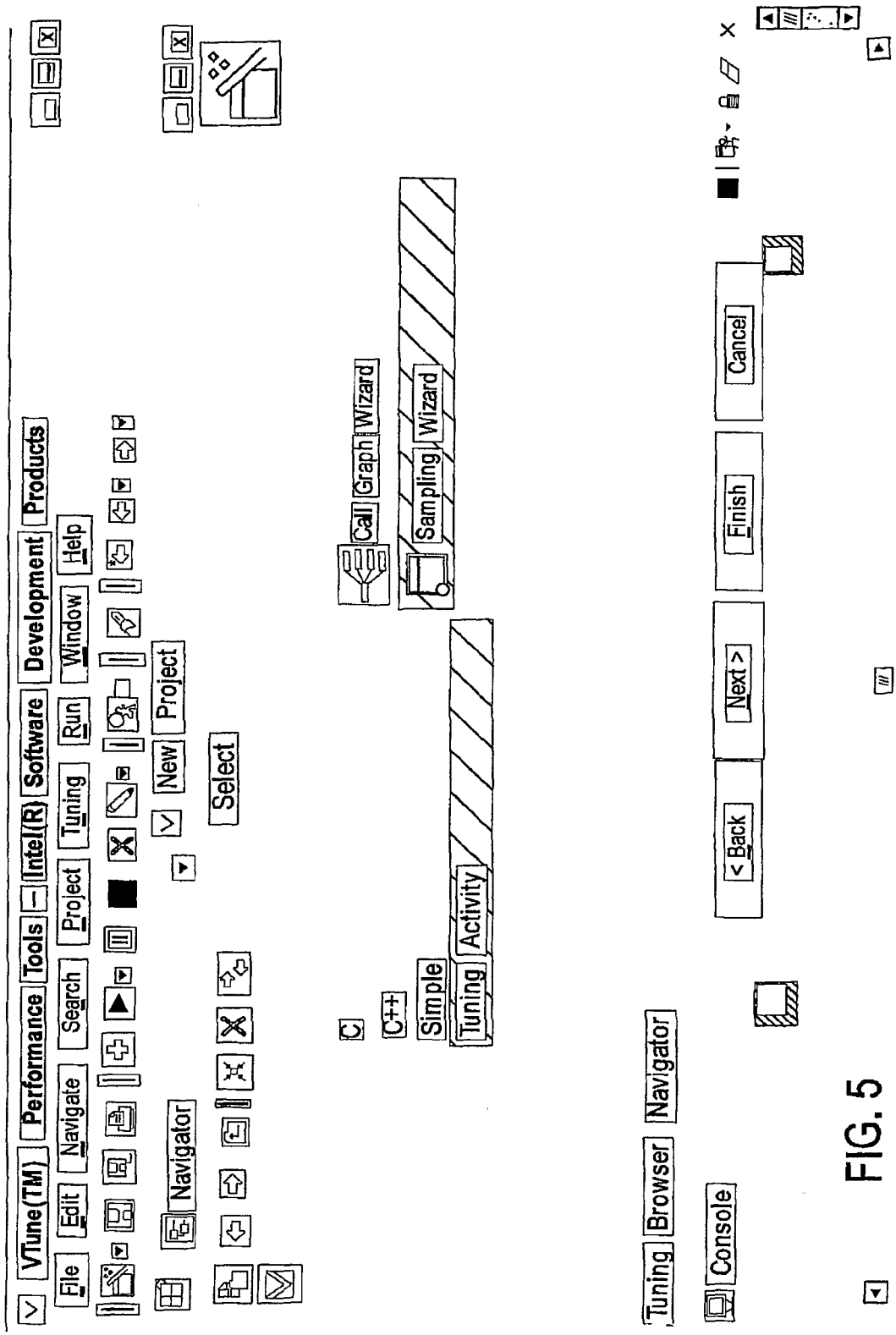
FIG. 5 is an example image illustrating objects identified during contouring operations of the recording phase according to an embodiment of the present invention.
Figure 6:
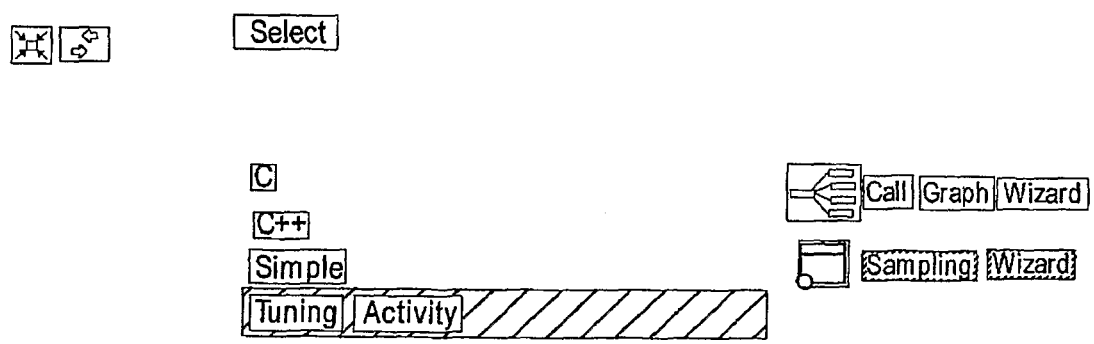
FIG. 6 is an example image illustrating objects of activity of the recording phase according to an embodiment of the present invention.

Example pseudo-code for one embodiment of the present invention is shown in Table III.

phase (IP). FIG. 3 is an example display of the GUI of an application program captured and saved during a recording phase. This IR screen shot shows that the item "Tuning Activity" was selected by the user using a mouse. FIG. 4 is an example display of the GUI of an application program captured during a playback phase. Note there are some insignificant changes in the displayed windows in comparison to FIG. 3. FIG. 5 is an example image illustrating objects identified during contouring operations of the recording phase according to an embodiment of the present invention as performed on the image of FIG. 3. FIG. 5 shows the sample output from block 200 of FIG. 2. FIG. 6 is an example image illustrating objects of activity of the recording phase according to an embodiment of the present invention as performed on the image of FIG. 5. These contours were identified after performing blocks 202 and 204 of FIG. 2 on the image from FIG. 5. The contour with the text labeled "Tuning" has been determined in this example to be the current object of activity. FIG.

TABLE III

Pseudo Code Example

```
BEGIN CCF
<<<<<<<< Recording >>>>>>>>
LOOP /*recording, e.g. till a special key combination */
    Wait on user action /*mouse, keyboard, it's possible to set something
else*/
    Hook and save screenshot /*e.g. <Screenshot fileName="1.png"/>*/
    Save time interval from the previous action /*e.g. <Sleep
duration="2000"/>*/
    Save information about user action
            /*e.g. <Mouse action="RightClick" x="100" y="200"/>*/
END LOOP /*recording, e.g. till a special key combination*/
EXIT
<<<<<<<< Post-processing >>>>>>>>
Process saved data into a more compact form. It's possible for the user to
change it for his or her needs.
<<<<<<<< Playback >>>>>>
LOOP /*till the end of saved data*/
    Load time interval and wait in accordance with it.
    IF [actions depend on coordinates on the screen] /*e.g. mouse click*/
THEN
            Load saved screenshot
            Detect object of action /*e.g. button*/, nearest structure-layout /*e.g.
menu items around button*/ and other useful info on saved screenshot
                TimeConditions_label: Hook the current screenshot
                Use image processing to find the corresponding object on the current
screenshot /*it's possible to require more information from saved
screenshot during search*/
                IF [Object not found] THEN
                        IF [Check time condition] /*e.g. it's possible to repeat search 3 times
with 1000-msec step, for example*/ THEN
                                GOTO TimeConditions_label
                        ELSE
                                EXIT with error code /*moreover, it's possible to send
corresponding report to log-file*/
                    END IF
            ELSE
                    Recalculate actions on a base of new found objects /*e.g.
recalculate new coordinates for mouse click*/
        END IF
    END IF
Produce actions /*it could be changed actions after image processing;
moreover, it's possible to finish execution in case of wrong situations during
actions*/
END LOOP /*till the end of saved data*/
EXIT
END CCF
```

Figure 7:
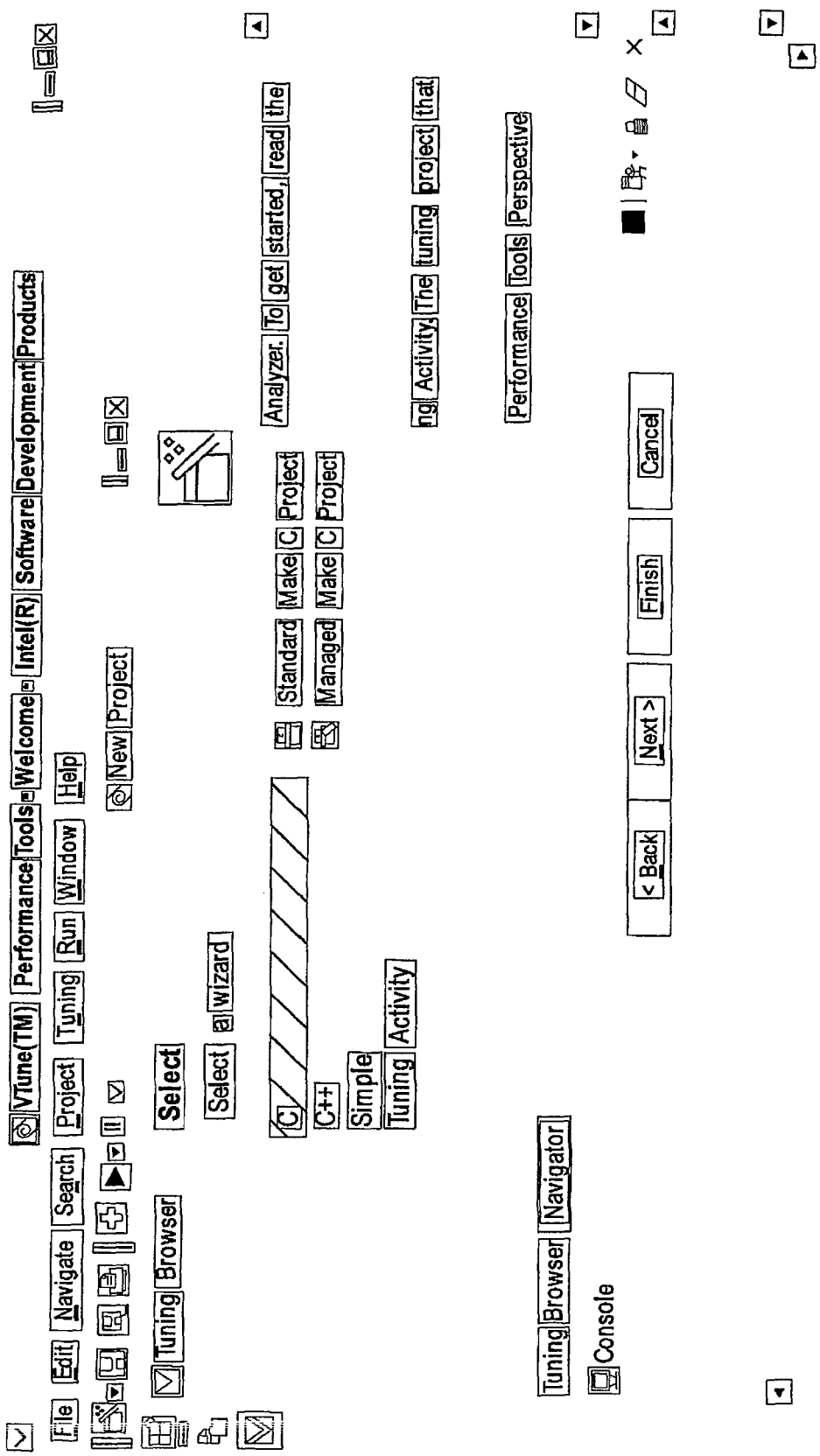
FIG. 7 is an example image illustrating objects identified during contouring operations of the playback phase according to an embodiment of the present invention.
Figure 8:
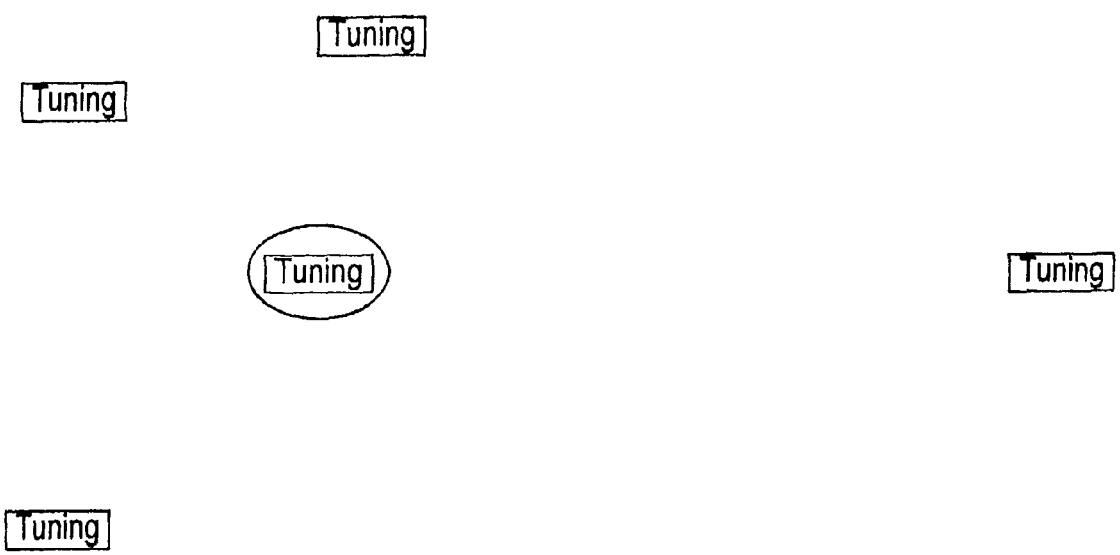
FIG. 8 is an example image illustrating a hypothesis during the playback phase according to an embodiment of the present invention.

Embodiments of the present invention including image analysis and object of activity detection on two images may be illustrated by the following examples using a performance analyzer application program. These figures show applying the process blocks of FIG. 2 to a first image from the recording phase (IR) and a corresponding image from the playback 7 is an example image illustrating objects identified during contouring operations of the playback phase according to an embodiment of the present invention. This image is output from performing block 206 of FIG. 2 on the sample image of FIG. 4. Finally, FIG. 8 is an example image illustrating a hypothesis during the playback phase according to an embodiment of the present invention. FIG. 8 shows hypotheses from FIG. 7 for the "Tuning Activity" object of activity from FIG. 6. Size, space, content, and structural filtration of blocks 206-214 has been performed. The ellipse represents the contour which was selected as the best hypothesis from performing block 216 of FIG. 2. A new point for the mouse click is recalculated relative to the given object (i.e., the "tuning" display object).

In some scenarios, filtration according to blocks 208 through 212 still result in many hypotheses to consider. The term hypothesis as used herein means a contour of an object on the playback image which corresponds to a contour of an object on the recorded image at a point in time. This means the previously applied filters didn't reject this correspondence of objects. When the number of hypotheses is large, more computational resources are needed. In one embodiment of the present invention, a methods for hypotheses filtration may be used to reduce the number of GUI hypotheses for objects in space (two dimensional (2D) for screen shots and multidimensional in the general case).

These methods comprise a search scheme that is simple yet powerful to select the right hypotheses despite the presence of several GUI noise conditions. In embodiments of the present invention, the noise conditions may comprise changeable color schemes, highlighting of items, noise from video devices, anti-aliasing, and other effects. GUI noise has two sources. The first source is the difference in GUI representation from run to run of the CCF system for a given application program. Between runs, for example there could be different positions of rows in a table, additional controls in a new product version, and so n. These differences result in changes in the playback images in comparison to the recorded images, as shown in the example images of FIGS. 15 and 16. The second source correlates with points of time when recorded and playback images are captured, especially if the user used a computer system's mouse for the user inputs to the application program under test. Briefly, when a recorded image is captured during a mouse action (such as clicking on the "New" item of FIG. 9), it is correlated with a captured playback image representing the results of the previous user action (such as clicking on the "File" menu header in FIG. 10). During the recording phase, the user moving the mouse from the "File" command to the "New" command activates a highlighting operation that is captured. During the playback phase, the CCF system doesn't move the mouse from the "File" position in the previous step because the position of the "New" command is not yet known (and must still be determined). These things change the view of the playback image in comparison with the corresponding recorded image.

Figure 11:
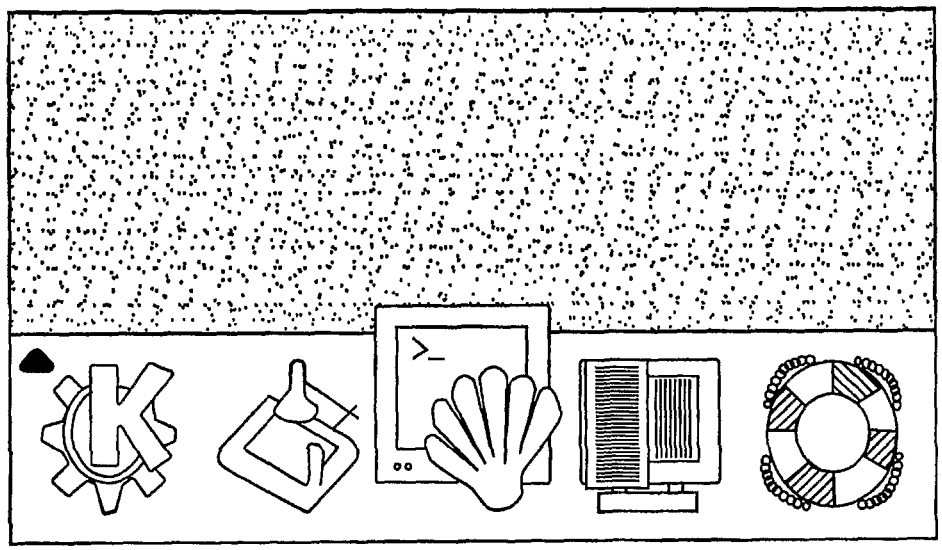
FIG. 11 is an example image illustrating an active object according to an embodiment of the present invention.
Figure 12:
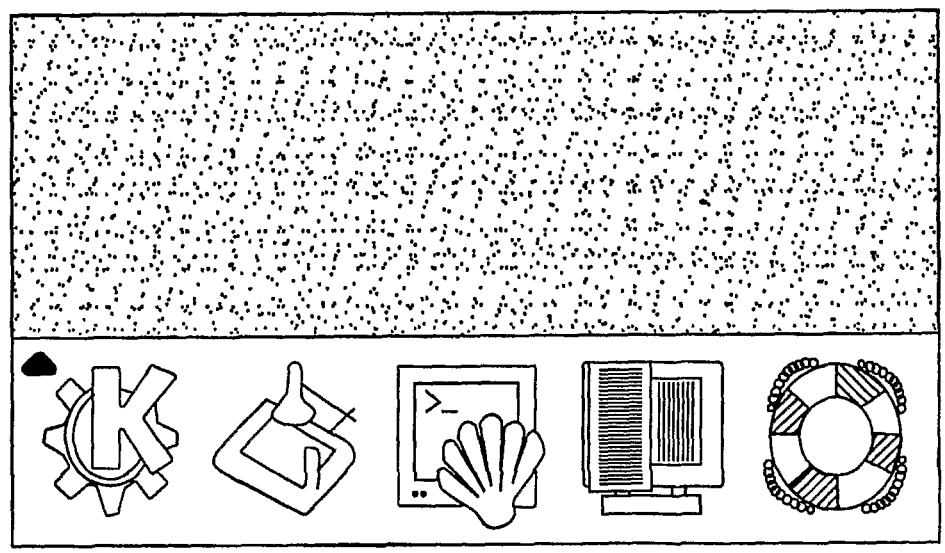
FIG. 12 is an example image illustrating an inactive object according to an embodiment of the present invention.
Figure 13:
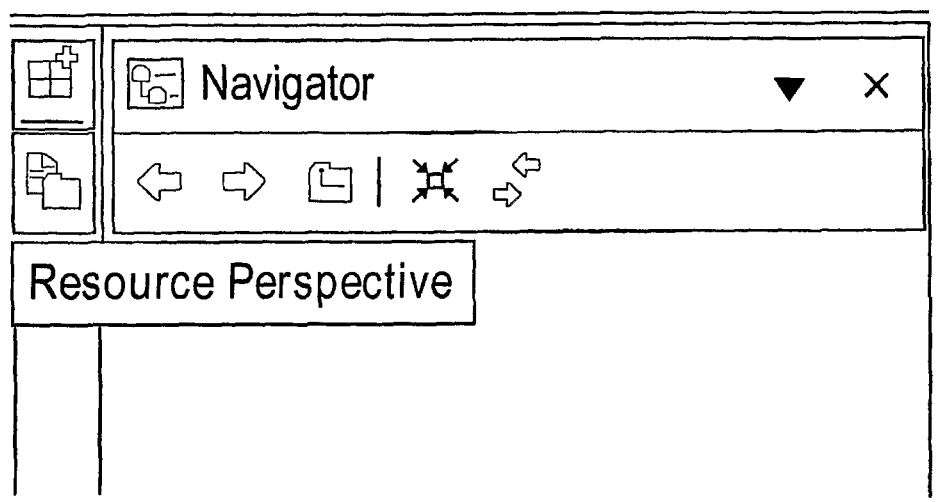
FIG. 13 is an example image illustrating a tool tip in a recorded image according to an embodiment of the present invention.
Figure 14:
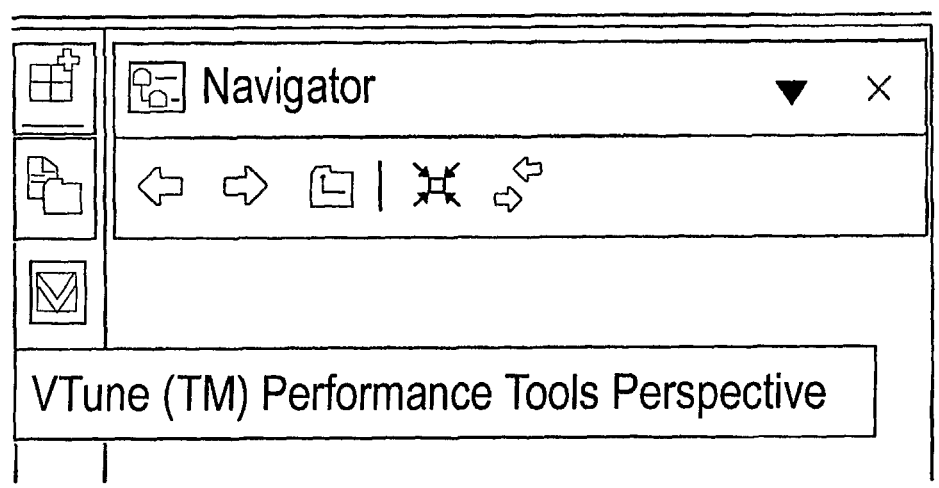
FIG. 14 is an example image illustrating a tool tip in a playback image according to an embodiment of the present invention.

Similar noise conditions are evident in FIGS. 11 and 12. Movement of a mouse results in generation of animation of the "clam" icon in FIG. 11. A similar situation is shown in FIGS. 13 and 14. Movement of the mouse generates the "Resource Perspective" tool tip during the recording phase on FIG. 13. Movement of the mouse from the previous step on the playback phase generated a "VTune™ Performance Tools Perspective" tool tip to be displayed, and the CCF system captured this event in the playback image as shown in FIG. 14.

In one embodiment of the present invention, the Cognitive Control Framework system reduces GUI noise after the recording phase for more effective play back. This embodiment correlates well with changes to the application program during product evolution. If an execution scenario is run several times, the CCF system will typically have problems with the search every time. One goal is to modify screen shots from the recording phase using new images from the playback phase and correct the scenario (e.g., point at new coordinates for mouse clicks). After this processing, the playback images will have fewer differences (GUI noise) than they had with initial screen shots from the recording phase. This allows users to select stronger conditions for playback, resulting in better performance and improved testing quality.

Figure 9:
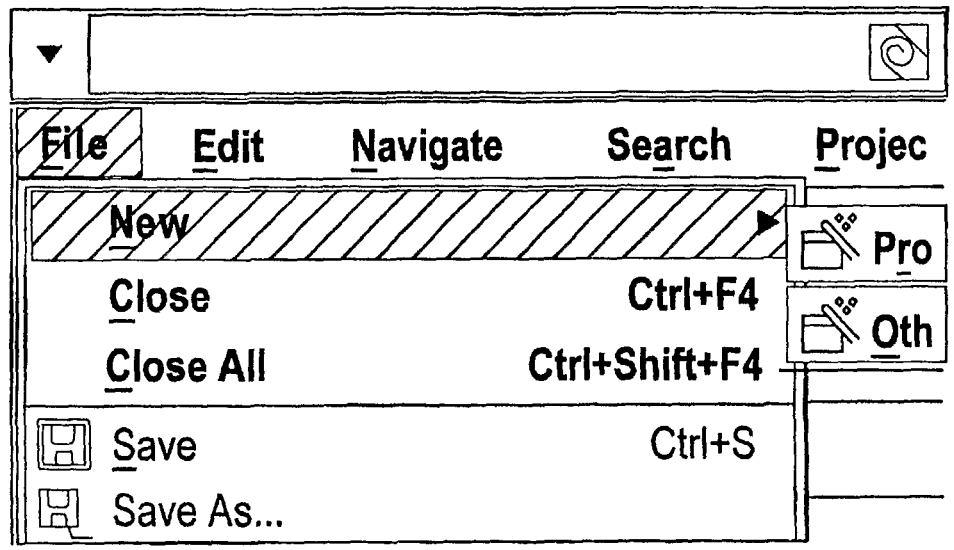
FIG. 9 is an example image illustrating a highlighted object according to an embodiment of the present invention.
Figure 10:
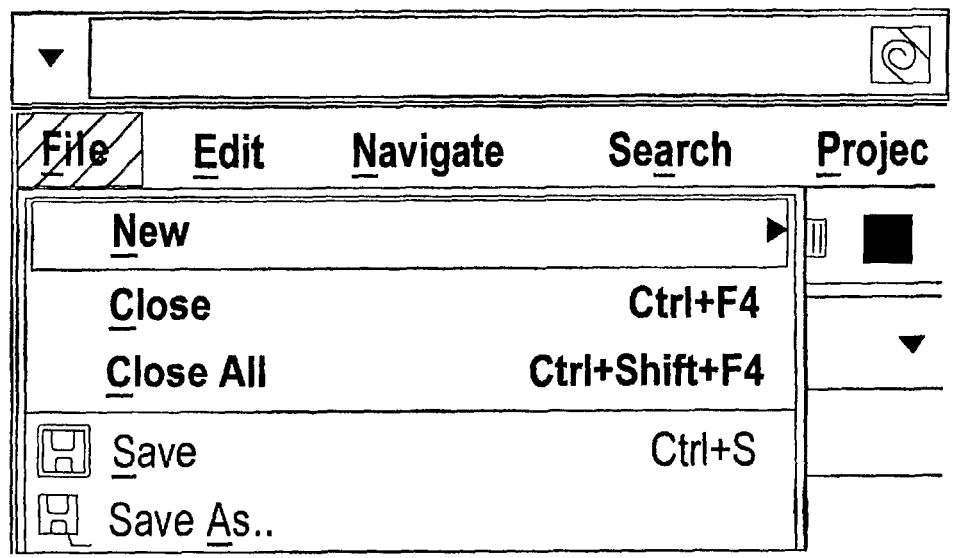
FIG. 10 is an example image illustrating an object with no highlighting according to an embodiment of the present invention.

For clarity of presentation, let's consider specific real examples of GUI noise during the recording phase. FIG. 9 is an example image illustrating a highlighted object in an image captured during the recording phase according to an embodiment of the present invention. The user clicked the "New" item in the "File" menu. Detailed behavior for a given activity could be the following (let's consider mouse activity, but the use of hot keys is also possible). The user moved the mouse from the "File" menu header to the "New" item and clicked on the "New" item. Highlighting for selected item is visible on the captured recorded image. On the other hand, a screenshot which could be captured during the play back phase (as shown in FIG. 10) will not show this highlighting because the CCF system task is searching for the corresponding item and the mouse will be situated at another position. This difference in images is a simple example of GUI noise after the recording phase.

The next example shows a more difficult GUI problem. FIG. 11 is an example image illustrating an active object according to an embodiment of the present invention. FIG. 11 presents an animated button which was pressed by mouse. FIG. 12 is an example image illustrating an inactive object according to an embodiment of the present invention. FIG. 12 shows the usual view of the button when it is not animated.

A similar noise situation is illustrated on FIGS. 13 and 14. FIG. 13 is an example image illustrating a tool tip in a recorded image according to an embodiment of the present invention. FIG. 14 is an example image illustrating a tool tip in a playback image according to an embodiment of the present invention. The recorded image shows a tool tip for a currently selected object but the playback image shows a tool tip for a previously pressed button.

Figure 15:
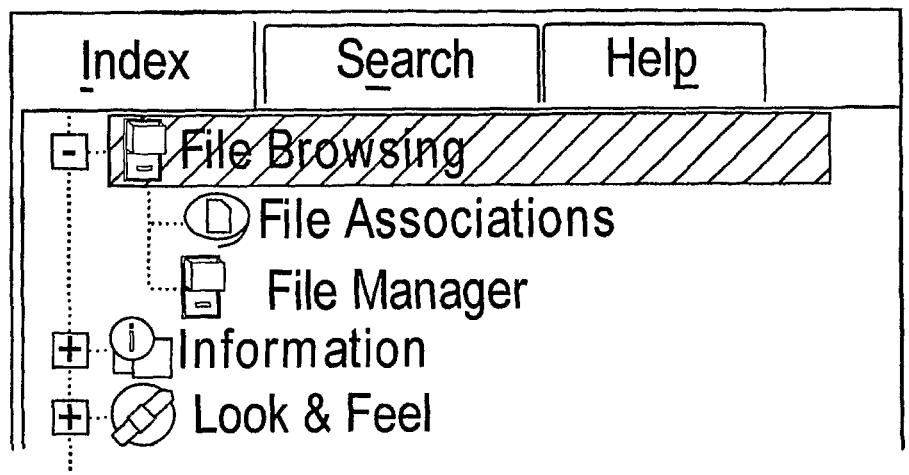
FIG. 15 is an example image illustrating an index structure in a first version of a GUI according to an embodiment of the present invention.
Figure 16:
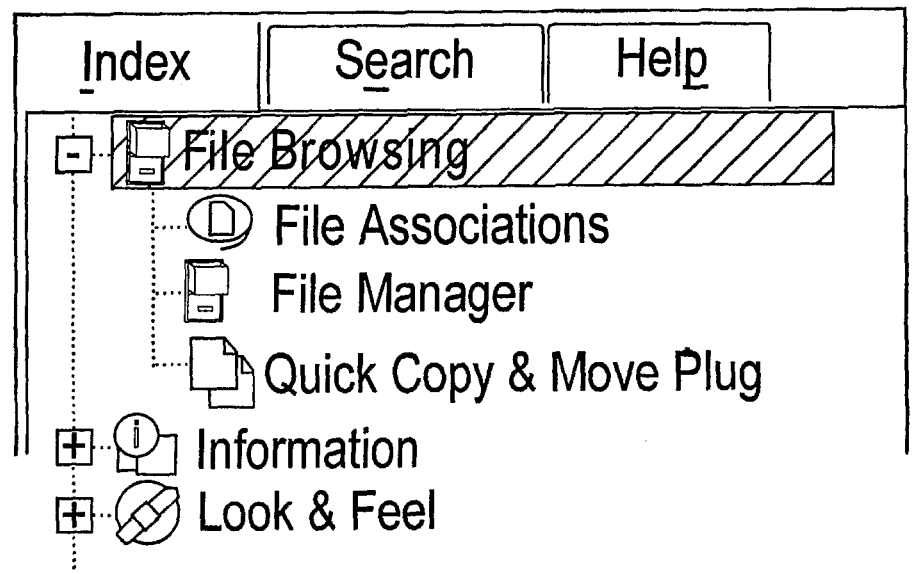
FIG. 16 is an example image illustrating another index structure in a second version of a GUI according to an embodiment of the present invention.

Sometimes GUI changes during product evolution may be considered as a GUI noise. FIG. 15 is an example image illustrating an index structure in a first version of a GUI according to an embodiment of the present invention. FIG. 16 is an example image illustrating another index structure in a second version of a GUI according to an embodiment of the present invention. For example, FIG. 16 shows an additional item "Quick Copy & Move . . . " in dialog and new icons for a new product version, but the old "significant" item still exists there also. New objects could be considered in this situation as GUI noise in accordance with a previous recorded image as shown in FIG. 15. This situation could be considered as evolution of the product with requirements to adapt to the new changes.

In some situations there are more complex examples for GUI behavior and more significant differences between the recording phase and the playback phase screenshots. One possible way to solve these problems with a search of objects is to create a new complex algorithm, with a huge knowledge base. This is a very difficult task because the software marketplace continually produces new versions of application program having new controls and different GUI behavior. Embodiments of the present invention comprise a more effective way to solve this problem.

Usually, search conditions for the playback phase are rather strong, especially for scenarios and tests where one of the general aims is to check for a stable product state at the current time. In this situation, the recorded execution scenario couldn't be successfully run in noisy environment. It will encounter significant differences between the recorded and playback screenshots from the point of strong conditions. It's possible to set less strict limits for the search. However, this decreases the potential for verification of bugs and it has a very negative effect on using effectiveness of the present invention. If recorded screenshots correspond to the correct and the current images it allows conditions to be kept without changes. Thus, the general problem is how to obtain "clear" screenshots with the right data about activities for further use in CCF system processing.

Let us assume a stable application program or controlling the program's execution and the ability to indicate a valid run of the CCF system for it. The execution scenario could be recorded, "softer" conditions set for playback, and the execution scenario run again in a self registration mode with control for valid execution. This means that the system captures screenshots and tries to find objects with more adaptive rules for search. The CCF system then saves the screenshot and new information about objects (for example, new coordinates for mouse actions). The CCF system should be able to save additional information from the executed scenario for its integrity. In other words, a new execution scenario should have updates for information correlated to screenshots (it could include coordinates, areas, images and text content, updated dynamical information, etc). Finally, visual information may be obtained which has better correspondence with the real images during further playbacks. This allows the CCF system to return to "strict" conditions to control application programs for bug verification and other tasks.

Methods for GUI noise reduction could be complex, but this complexity is less than the corresponding complexity for investigation and development of a search scheme in a GUI noise environment. Moreover, knowledge about an application program that is valid for execution could help to automate refreshing of the execution scenario through multiply runs in case of playback faults.

Embodiments of the present invention include methods which make effective refreshing of the execution scenarios. In other embodiments, additional methods may be used to improve GUI noise reduction that leads to easy portability and updates for scenarios between different operating systems and versions during product evolutions. An embodiment of the present invention includes a hierarchy of methods (e.g., algorithms, schemas, "strict" conditions, etc.) as shown below.

1. At first, use "strict" methods. The playback images typically don't have significant differences with the recording images, so it makes sense to use narrow bounds for each parameter, e.g., size of contours, text content, layout, etc.

2. Use stable to highlighting methods because this is the usual situation for GUI dialogs, menus, etc. The simplest change which could take place is highlighting, and a method which is stable may be used for handling highlighting.

3. Use environment information because this data usually has less noise than a searched active object. The simplest example of this is animation: an active object on the playback image (such as in FIG. 12) is different from one on the recording image (such as in FIG. 11); additional objects are similar.

4. Use text information because action changes could be only in the fonts used. A simple change which could take place is another text font and a method may be used which is stable for handling font changes.

5. Use additional delays during tests execution (but save old test runs) because this helps avoid trouble with early "soft" searching. An additional load on the operating system could affect execution time for the application program, so it's possible to use delays when capturing the screenshot and search objects during playback to promote obtaining a good result.

6. Use a complex search and the best hypothesis chosen through corresponding methods, e.g., "fuzzy" ones. Sometimes the application program could provide a different view on every run, so the user could provide his or her own complex methods to find active objects. For example, an iterative search procedure may be used.

7. Divide the execution scenario into modules because this helps refresh and tune the execution scenario over multiple runs. Some steps (row of steps) could be replayed with one type of search parameters and others with different search conditions; it's easier to split a task into sub-tasks and solve them individually.

8. Use "as is" play back scheme and/or manual updating for screenshots and recorded information in very difficult situations. Manual correction for the scenario could help, and the playback may be processed with "point-to-point" conditions (e.g., manually select the same point with the mouse during playback as it took place during the recording phase).

Figure 17:
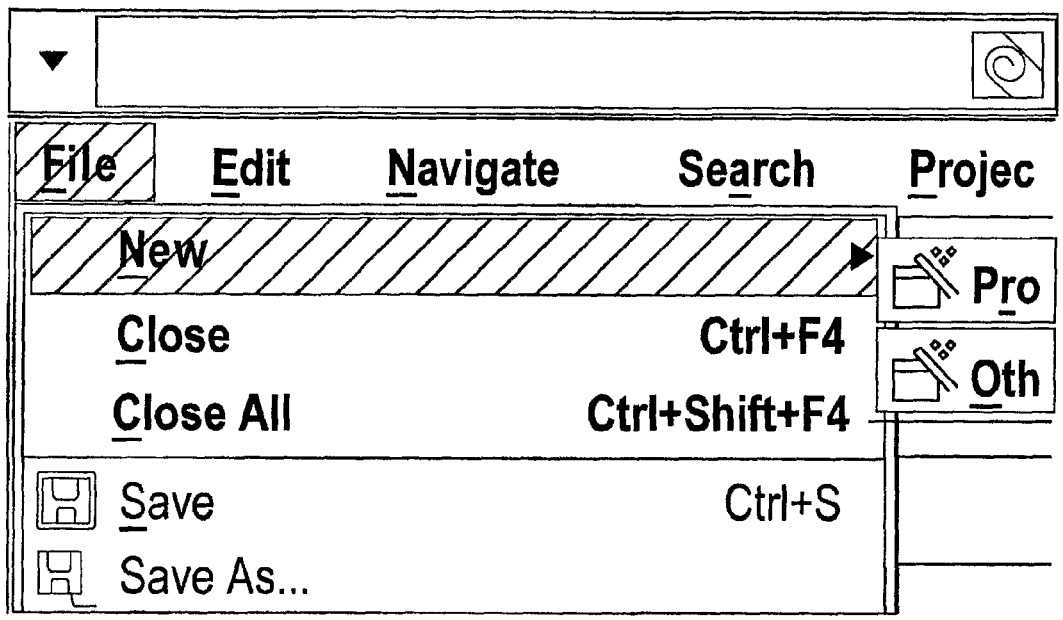
FIG. 17 is an example image illustrating a recorded image according to an embodiment of the present invention.
Figure 18:
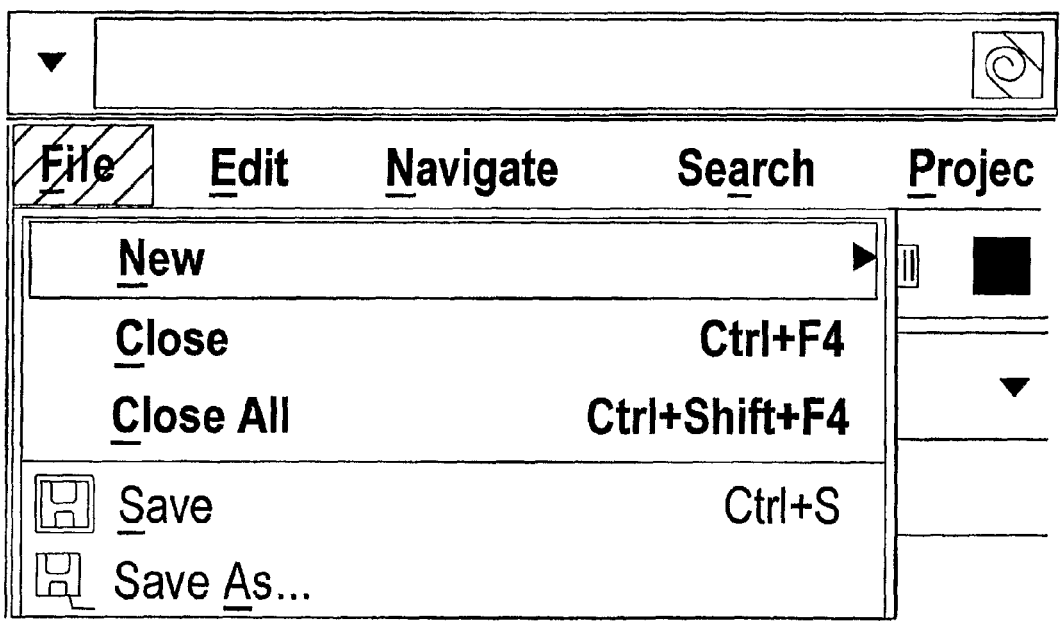
FIG. 18 is an example image illustrating a playback image according to an embodiment of the present invention.

In at least one embodiment of the present invention, at a first stage of processing, the recorded image and the execution scenario are obtained for every step of operation of the application program under test. Next, "soft" search conditions may be set. Soft search conditions include a first set of bounds for differences in shapes of contours, text and image content, layout, etc. Then, the execution may be played back automatically using the CCF system. FIG. 17 is an example image illustrating a recorded image according to an embodiment of the present invention. It is a result of a valid execution and soft conditions being applied. For every step of the operation of the application program, a new playback image may be generated. Soft search conditions allow the CCF system to attempt to find the right active object in spite of GUI noise. The recorded and newly generated playback images are saved again and the execution scenario may be modified with new coordinates for mouse (or other user input) activity. Typically, this is the only change done to update an execution scenario. FIG. 18 is an example image illustrating a playback image according to an embodiment of the present invention. In this example, FIG. 18 does not quite match FIG. 17.

Figure 19:
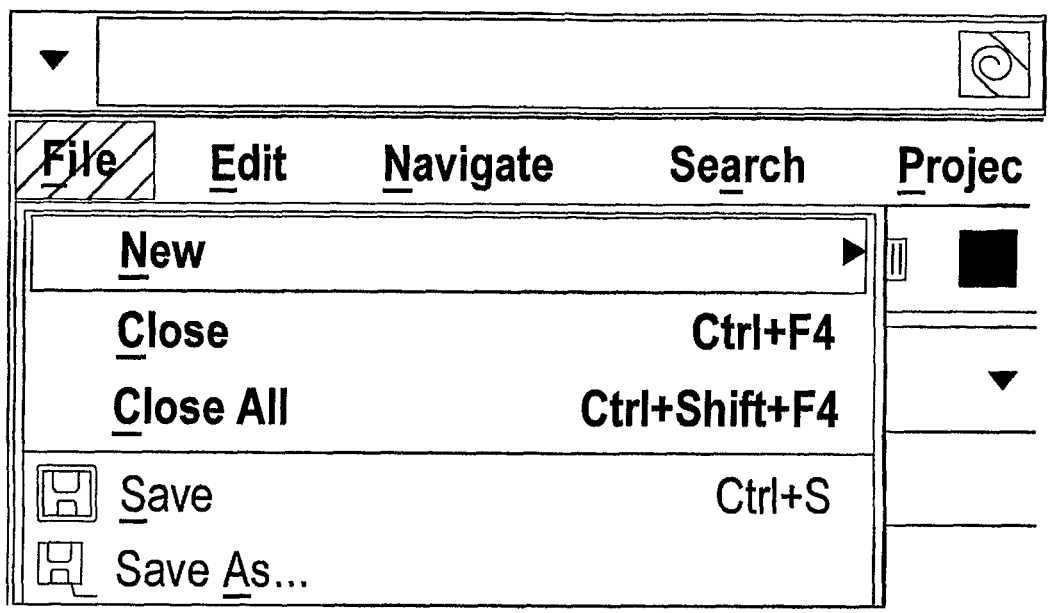
FIG. 19 is an example image illustrating another recorded image according to an embodiment of the present invention.
Figure 20:
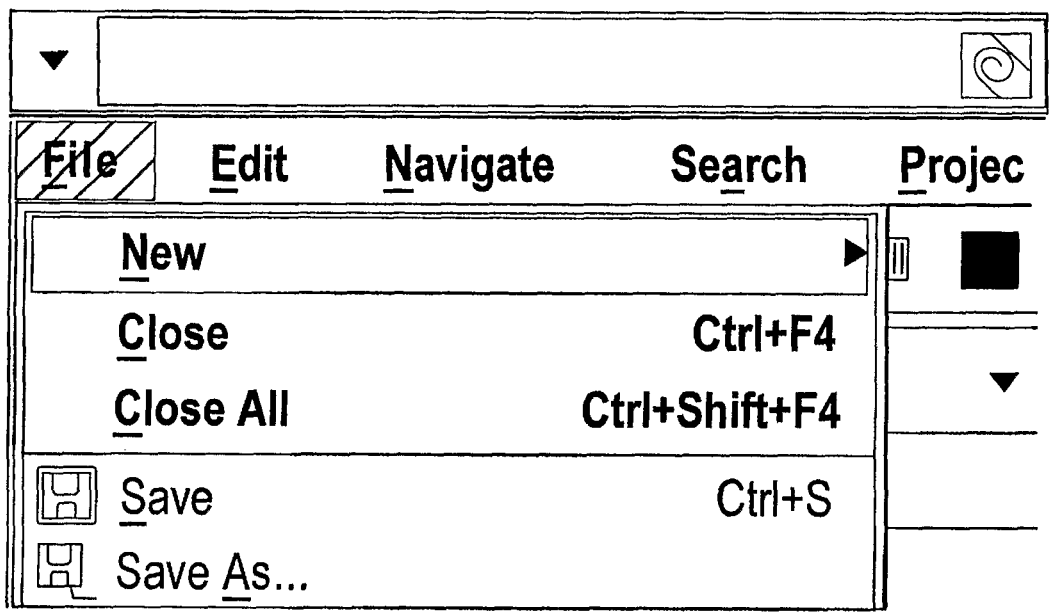
FIG. 20 is an example image illustrating another playback image according to an embodiment of the present invention.

At a second stage of processing, the search conditions may be set to "stronger" or "stricter" search conditions for applying the execution scenario to verify execution of the application program. Strict search conditions include a second set of bounds for differences in shapes of contours, text and image content, layout, etc. The first set of bounds of differences is different than the second set of bounds of differences. At this time, the recorded images are screenshots obtained from playback processing using "soft" search conditions as in FIG. 18. Thus, FIG. 19 is an example image illustrating another recorded image according to an embodiment of the present invention. This recorded image was copied from the previously generated playback image. For every step of the execution scenario, a new playback image may be generated during playback, such as is shown in FIG. 20. This playback image, in the case of the right workflow of the application program, is similar to the recorded image of FIG. 19. This processing allows the CCF system to better adapt to any inconsistencies in the application program.

Figure 21:
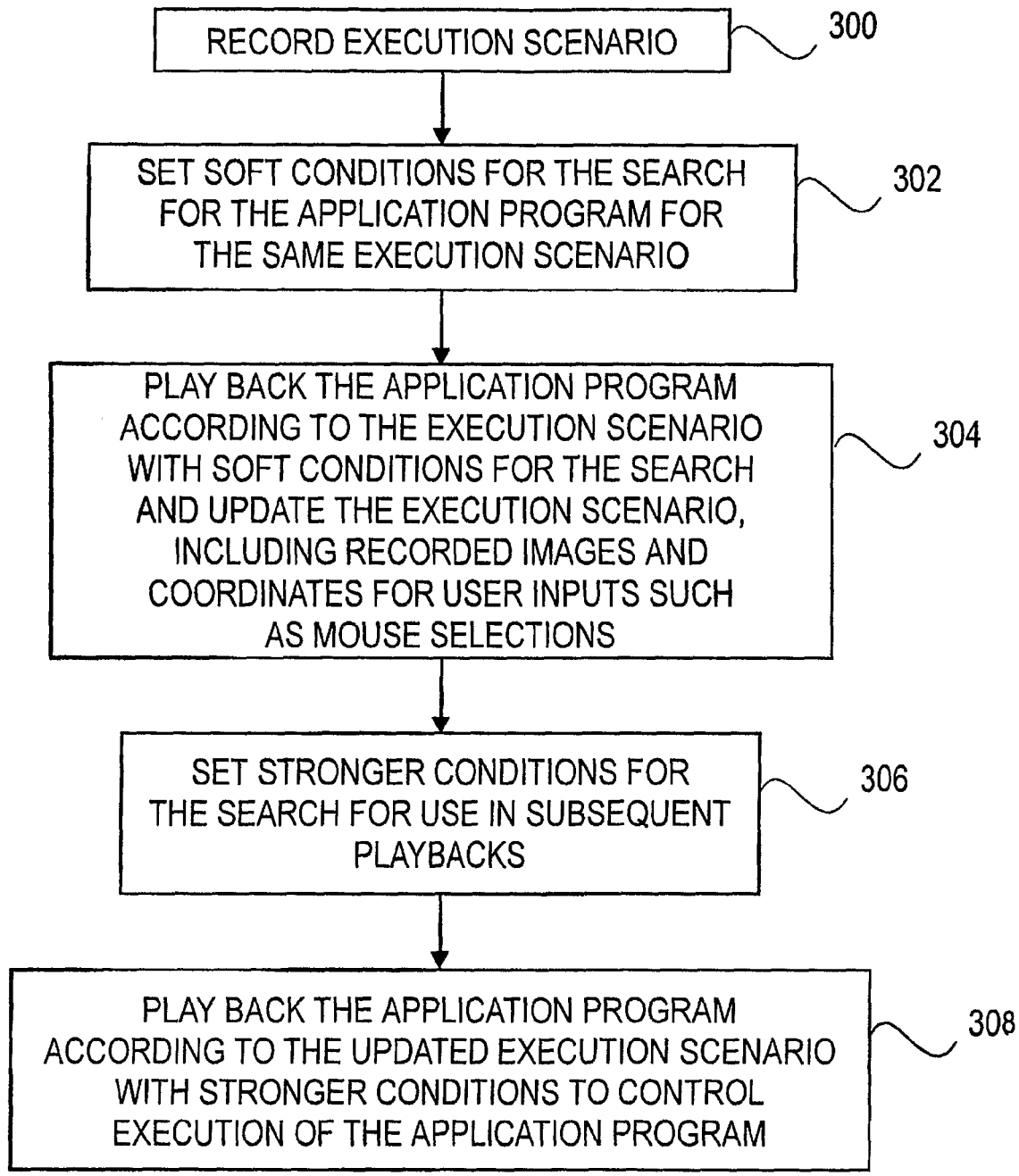
FIG. 21 is a flow diagram illustrating GUI noise reduction processing according to an embodiment of the present invention.

FIG. 21 is a flow diagram illustrating GUI noise reduction processing according to an embodiment of the present invention. At block 300, the execution scenario may be recorded. At block 302, soft search conditions may be set for the application program for the same execution scenario. At block 304, the application program may be played back under the control of the CCF system according to the execution scenario with soft conditions for the search. During playback the execution scenario may be updated, including saving new recorded images (taken from generated playback images) and coordinates for user inputs such as mouse selections. At block 306, stronger conditions for the search may then be set for use in subsequent playbacks. At block 308, the application program may be played back again under the control of the CCF system according to the updated execution scenario with stronger search conditions. This process may be repeated until a satisfactory result is achieved. An active object should be found because the application program is known to work correctly during a given playback and the object should exist.

An advantage of embodiments of the present invention is that it is applicable to any application program exposing a visual interface on any platform and operating system, and is not dependent on a specific API, or architecture of visual system implementation (like Win32 or X-Windows API), or specific operating system. It correlates with an advantage of the overall Cognitive Control Framework approach, which works across platforms. All other known systems are dependent to a small or large extent on system APIs while working with visual elements. A further advantage of this approach is that it is an easy way to clear screen shots from unnecessary user activity effects. It further decreases the problems during playback. Another advantage is that it is an easy way to help with automatic portability of old scenarios to new versions of products. It decreases the time needed to support a baseline of scenarios for application program testing. Another advantage is that it is a scalable way for using new algorithms for solving the execution scenario refresh task.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Although the operations detailed herein may be described as a sequential process, some of the operations may in fact be performed in parallel or concurrently. In addition, in some embodiments the order of the operations may be rearranged without departing from the scope of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A computer-implemented method of reducing graphical user interface (GUI) noise comprising:
   during a recording phase of operation of a cognitive control framework system, capturing and storing user input actions and corresponding displayed images responsive to individual input actions while the user is using a graphical user interface (GUI) of an application program, and creating a first execution scenario based on the captured user input actions and corresponding displayed images;
   during a first playback phase of operation of the cognitive control framework system, automatically providing the captured user input actions of the first execution scenario to the application program, for each of the captured user input actions automatically provided to the application program, generating and capturing a first playback image responsive to the provided captured user input action, performing image analysis on the generated first playback image using a recorded image of the first execution scenario displayed responsive to a next provided captured user input action, finding a next object to receive the next provided captured user input action in the generated first playback image based on the image analysis, the finding of the next object based on at least one search parameter having a broad limit to enable the next object to be found in spite of a noise-induced difference between the generated first playback image and the recorded image of the first execution scenario, and recalculating input action data for the next provided captured user input action according to the found next object;
   modifying the first execution scenario to form a second execution scenario to reduce the noise-induced differences observed in the GUI during the first playback phase, the modifications to include the recalculated input action data and the first playback images;

resetting the at least one search parameter to have a narrow limit compared to the broad limit, the narrow limit to account for the reduction in the noise-induced differences in the GUI; and playing back the application program according to the second execution scenario, displaying a second playback image in response to a recalculated input action from the second execution scenario, performing image analysis on the second playback image to find the next object in the second playback image, the image analysis performed using a first playback image in the second execution scenario corresponding to the next recalculated input action from the second execution scenario, the finding of the next object in the second playback image based on the at least one search parameter having the narrow limit.

2. The method of claim 1, wherein the at least one search parameter having a broad limit is to account for noise-induced differences that occur in at least one of shapes of contours, text and image content, or layout.

3. The method of claim 2, where the at least one search parameter is reset to have a narrow limit with respect to differences that occur in at least one of shapes of contours, text and image content, or layout.

4. The method of claim 1, wherein a user input action recorded during the recording phase comprises a mouse selection, and the first execution scenario is modified to include recalculated display coordinates to indicate where the mouse selection is to be automatically applied according to the second execution scenario, the display coordinates being recalculated based on the automatic mouse selection of a next object found in a first playback image.

5. The method of claim 1, wherein GUI noise comprises at least one of changeable color schemes, highlighting of items, noise from video sources, and anti-aliasing effects.

6. The method of claim 5, further comprising:
during the recording phase, highlighting a display item in response to a given user input action and capturing the given user input action and the corresponding displayed image having the highlighted display item;
during the first playback phase, comparing a currently generated first playback image responsive to a prior captured user input action to the recorded displayed image having the highlighted display item, the highlighting comprising a noise-induced difference between the currently generated first playback image and the recorded displayed image, based on the comparison and the at least one search parameter having a broad limit, finding the next object in the currently generated first playback image that is to receive the captured given user input action, and in response to providing the captured given user input action to the application program, generate a subsequent first playback image with the found next object as a highlighted display item.

7. An article comprising:
a non-transitory machine accessible storage medium containing instructions, which when executed, result in reducing graphical user interface (GUI) noise by, during a recording phase of operation of a cognitive control framework system, capturing and storing user input actions and displayed images responsive to the user input actions while the user is using a graphical user interface (GUI) of an application program, and creating a first execution scenario based on the captured user input actions and the displayed images;
during a first playback phase of operation of the cognitive control framework system, automatically providing the captured user input actions of the first execution scenario to the application program, generating and capturing a first playback image responsive to a particular provided captured user input action, finding an object in the generated first playback image which is to receive a next provided captured user input action, the finding of the object based on image analysis of the generated first playback image using a recorded image of the first execution scenario displayed responsive to the next captured user input action and on at least one search parameter having a broad limit to enable the object to be found in spite of a noise-induced difference between the generated first playback image and the recorded image of the first execution scenario, and recalculating input action data for the provided next captured user input action based on the found object;
updating the first execution scenario to form a second execution scenario to reduce the noise-induced differences observed in the GUI during the first playback phase, the updates to include the recalculated input action data and the first playback images;
resetting the at least one search parameter to have a narrow limit compared to the broad limit, the narrow limit to account for the reduction in the noise-induced differences in the GUI; and
playing back the application program according to the second execution scenario, displaying a second playback image in response to a recalculated input action from the second execution scenario, performing image analysis on the second playback image to find the object in the second playback image, the image analysis performed using a first playback image from the second execution scenario which was responsive to the next recalculated input action from the second execution scenario, the finding of the object in the second playback image based on the at least one search parameter having the narrow limit.

8. The article of claim 7, wherein the at least one search parameter having a broad limit is to account for noise-induced differences that occur in at least one of shapes of contours, text and image content, or layout.

9. The article of claim 8, where the at least one search parameter is reset to have a narrow limit with respect to differences that occur in at least one of shapes of contours, text and image content, or layout.

10. The article of claim 7, wherein the particular provided captured user input action comprises a mouse selection, and the second execution scenario includes recalculated display coordinates to indicate where to apply the mouse selections in a previously displayed second playback image.

11. The article of claim 7, wherein GUI noise comprises at least one of changeable color schemes, highlighting of items, noise from video sources, and anti-aliasing effects.

12. A method of automatically controlling execution of an application program having a GUI to reduce GUI noise comprising:
capturing user input data and images displayed by the GUI responsive to the captured user input data during a recording phase of execution of the application program;
analyzing the captured user input data and responsive recorded images to generate a first execution scenario during the recording phase;
generating simulated user input data based on the first execution scenario during a first playback phase of execution of the application program and inputting the simulated user input data to the application program;

performing image analysis on first playback images displayed by the GUI as a result of processing the simulated user input data during the first playback phase and the recorded images, the image analysis to enable finding, in each first playback image, a next object to receive a next input action according to the first execution scenario, the finding based on a search parameter having a broad limit to enable the next objects to be found in spite of GUI noise conditions that create differences between the recorded images and the first playback images;

updating the first execution scenario to form a second execution scenario to reduce GUI noise conditions observed during the first playback phase, the updates including the first playback images and recalculated user input data corresponding to the next objects found in the first playback images;

resetting the search parameter to have a narrow limit as compared to the broad limit to account for the reduced GUI noise; and playing back the application program according to the second execution scenario and performing image analysis on second playback images displayed by the GUI as a result of processing simulated user input data and first playback images in the second execution scenario to find the next object in each second playback image, the finding of the next object in the second play back images based at least on the reset search parameter having the narrow limit.

13. The method of claim 12, wherein the search parameter having a broad limit comprises a first set of bounds for differences in one of shapes of contours, text and image content, or layout.

14. The method of claim 13, where the search parameter having the narrow limit comprises a second set of bounds for differences in one of shapes of contours, text and image content, or layout, the second set being different than the first set.

15. The method of claim 13, wherein GUI noise conditions comprise at least one of changeable color schemes, highlighting of items, noise from video sources, and anti-aliasing effects.

16. An article comprising:
a non-transitory machine accessible storage medium containing instructions, which when executed, result in automatically controlling execution of an application program having a GUI to reduce GUI noise by, capturing user input data and images displayed by the GUI responsive to the captured user input data during a recording phase of execution of the application program;
analyzing the captured user input data and responsive recorded images to generate a first execution scenario during the recording phase;
generating simulated user input data based on the first execution scenario during a first playback phase of execution of the application program and inputting the simulated user input data to the application program;
performing image analysis on first playback images displayed by the GUI as a result of processing the simulated user input data during the first playback phase and the recorded images, the image analysis to enable finding, in each first playback image, a next object to receive a next input action according to the first execution scenario, the finding based on a search parameter having a broad limit to enable the next objects to be found in spite of GUI noise conditions that create differences between the recorded images and the first playback images;
updating the first execution scenario to form a second execution scenario to reduce GUI noise conditions observed during the first playback phase, the updates including the first playback images and recalculated user input data corresponding to the next objects found in the first playback images;
resetting the search parameter to have a narrow limit as compared to the broad limit to account for the reduced GUI noise; and
playing back the application program according to the second execution scenario and performing image analysis on second playback images displayed by the GUI as a result of processing simulated user input data and first sla back ima es in the second execution scenario to find the next object in each second playback image, the finding of the next object in the second play back images based at least on the reset search parameter having the narrow limit.

17. The article of claim 16, wherein the search parameter having a broad limit comprises a first set of bounds for differences in one of shapes of contours, text and image content, or layout.

18. The article of claim 17, where the search parameter having the narrow limit comprises a second set of bounds for differences in one of shapes of contours, text and image content, or layout, the second set being different than the first set.

19. The article of claim 16, wherein GUI noise conditions comprise at least one of changeable color schemes, highlighting of items, noise from video sources, and anti-aliasing effects.

* * * * *

UNITED STATES PATENT AND TRADEMARK OFFICE
CERTIFICATE OF CORRECTION

PATENT NO. : 8,429,612 B2
APPLICATION NO. : 10/587342
DATED : April 23, 2013
INVENTOR(S) : Denis Sergeevich Milov It is certified that error appears in the above-identified patent and that said Letters Patent is hereby corrected as shown below:

In the Claims:

Column 18:
Line 47, "comprises a mouse" should be --comprises mouse--

Column 18:
Line 49, "selections" should be --selection--

Column 20:
Line 31, "sla back ima es" should be --playback images--

Signed and Sealed this
Eighteenth Day of June, 2013

Teresa Stanek Rea
*Acting Director of the United States Patent and Trademark Office*